July 14, 1931.  L. W. FINLEY  1,814,374
MACHINE FOR PROCESSING AND WASHING EGGS
Filed May 5, 1930  2 Sheets-Sheet 2

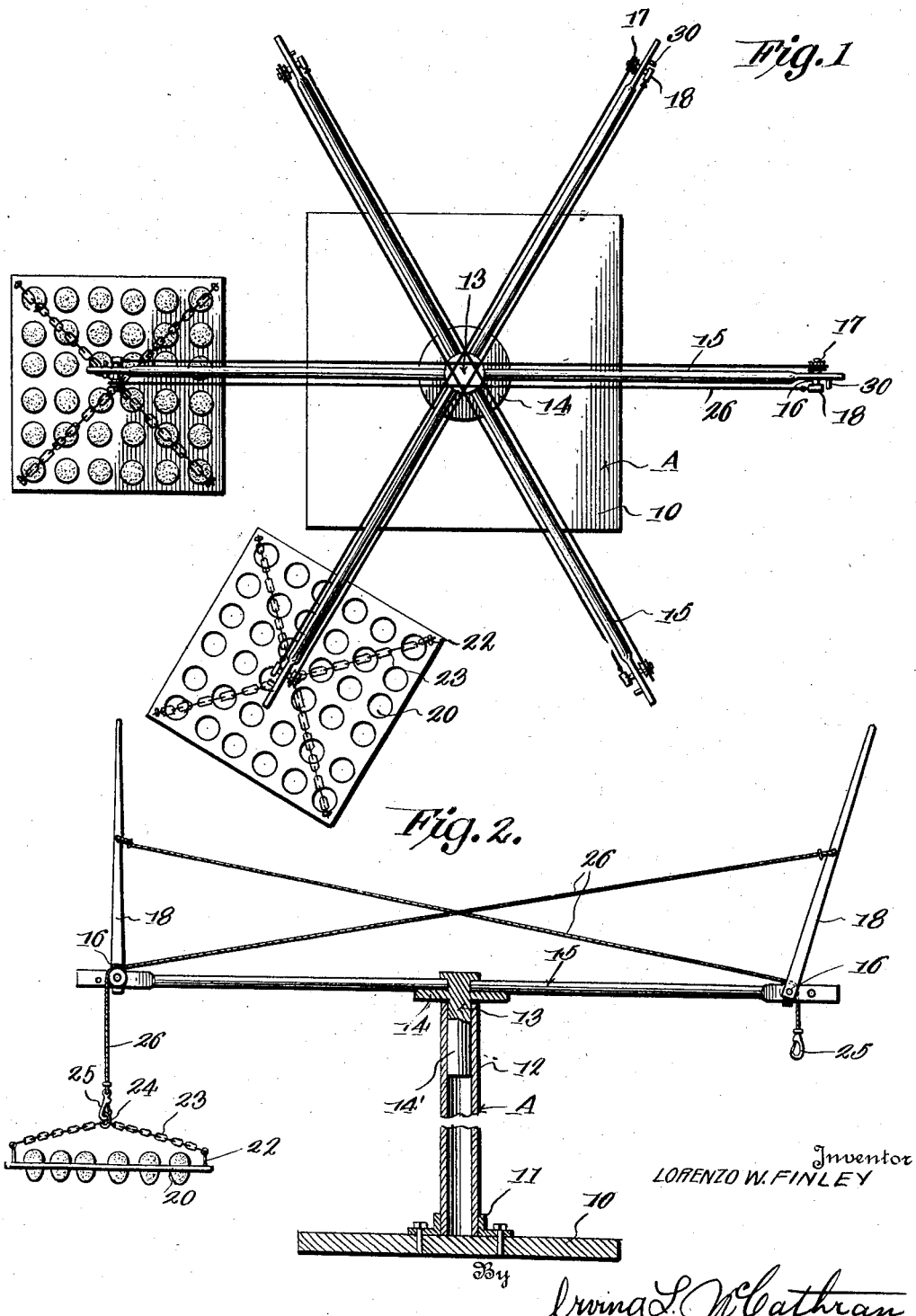

Inventor
LORENZO W. FINLEY

By Irving L. McCathran
Attorney

Patented July 14, 1931

1,814,374

UNITED STATES PATENT OFFICE

LORENZO W. FINLEY, OF PHOENIX, ARIZONA

MACHINE FOR PROCESSING AND WASHING EGGS

Application filed May 5, 1930. Serial No. 449,930.

This invention appertains to a novel machine for handling trays of eggs during the washing or coating thereof whereby the eggs may be conveniently and quickly washed or coated, as the case may be.

In the so called egg processing, the eggs are dipped in a suitable solution so that the pores thereof will be impregnated with a sealing solution thereby effectively excluding air from the eggs and the entrance of objectionable odors into the eggs.

The dipping and the drying of the eggs has been quite an expensive procedure and difficulty has been experienced with the handling of the eggs during the dipping and drying process, the machines on the market for this purpose being of a complicated and expensive nature and difficult for the average person to operate.

It is therefore one of the primary objects of my invention to provide a device of an exceptionally simple and durable character embodying a minimum number of parts for effectively handling the egg trays during the dipping process, the machine being of an inexpensive and rugged character.

Another important object of my invention is the provision of an egg processing machine embodying means for moving egg trays in a step by step movement in a circular path and for permitting the convenient raising and lowering of the egg trays during the movement thereof in the circular path, the raising and lowering of the eggs permitting the dipping thereof into a vat, and the travel of the eggs in a circular path permitting the convenient draining thereof and drying thereof and allowing the trays of dipped eggs to be removed and replaced with the trays of undipped eggs.

With these and other objects in view, the invention consists in the novel construction, arrangement and formation of parts, as will be hereinafter more specifically described, claimed, and illustrated in the accompanying drawings, in which drawings:—

Figure 1 is a top plan view of my improved machine.

Figure 2 is a central diametric section through the same.

Figure 3:
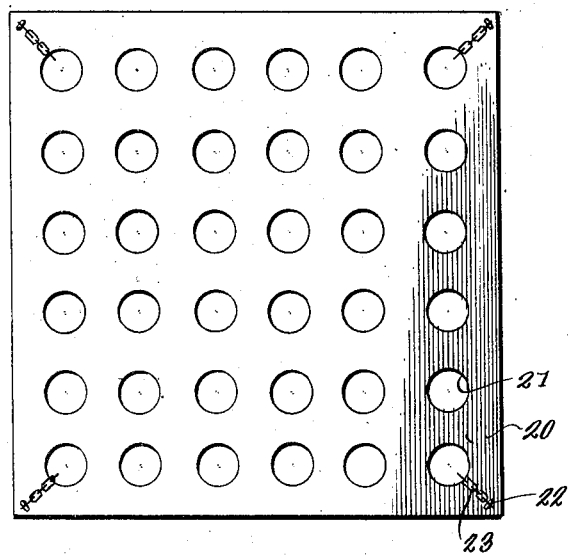
Figure 3 is a detail plan view of one of the trays.
Figure 4:
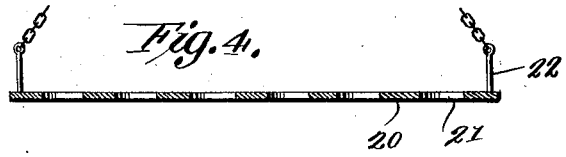
Figure 4 is a central section through one of the trays.
Figure 5:
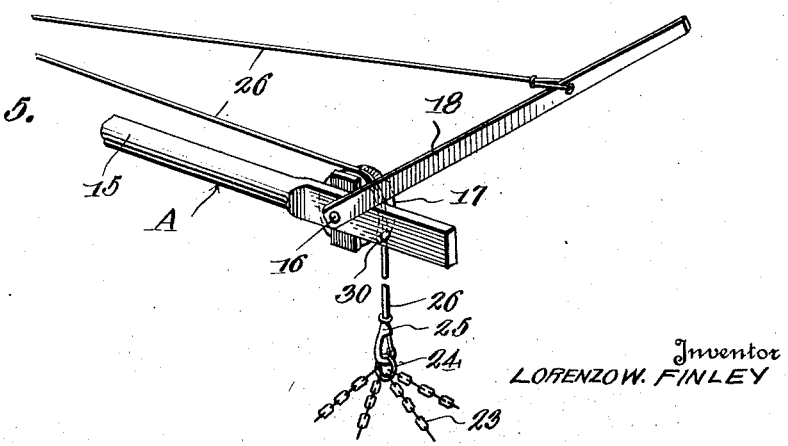
Figure 5 is a detail perspective view of one of the supporting arms showing the guide pulleys carried thereby for one raising and lowering cable and an operating lever carried thereby for another raising and lowering cable.

Referring to the drawings in detail, wherein similar reference characters designate corresponding parts throughout the several views, the letter A generally indicates my improved egg handling machine which comprises a ground or floor engaging base 10 of the desired size and strength and of any heavy material, such as iron. Bolted to the upper face of the base 10 at the central portion thereof is a supporting collar or cuff 11 which receives the axially disposed standard 12 of the desired type. This standard can be in the nature of a hollow pipe, if preferred. The upper end of the standard 12 supports the rotatable head 13 which may embody a disc shaped plate 14 and a depending axial stub shaft or bearing 14'. This stub shaft or bearing 14' is received in the upper end of the standard 12 and the disc 14 can rest on the upper edge of the said standard, if desired. The upper face of the disc shaped plate 14 can have welded thereto a plurality of radially extending arms 15, for a purpose which will be more clearly described.

It is to be noted that the arms are of a sufficient length to extend a considerable distance beyond the base 10. Any preferred even number of arms 15 can be used and in the present instance I have illustrated six of the said arms and these arms are equadistantly spaced one from the other in such a manner that the arms are arranged in diametrically aligned pairs.

In accordance with my invention the outer end of each arm receives a transversely extending shaft 16 on one end of which is rotatably mounted a guide pulley 17 and on the other end a swinging operating lever 18, which extends upwardly from the arms.

Each arm carries an egg tray 20 which can be made of thin sheet metal, if so desired, and the tray is provided with any preferred number of openings 21 for receiving the eggs to be dipped. As shown, each corner of the tray 20 is provided with an upstanding eyebolt or the like 22 to which is attached a short inwardly extending chain 23. The chains 23 are connected together above the center of the tray 20 by means of an eye 24 to which is adapted to engage a snap hook 25, the snap hook 25 is carried by the outer end of a manipulating or raising and lowering cable 26 which is trained over a pulley 17, the opposite end of the cable being secured to a manipulating lever 18 at a point intermediate its ends.

By this construction and arrangement it is to be noted that each pair of arms carries two cables and two trays and that the cables cross one another above the shaft 14'.

In use of my improved device the trays are hooked on the cables with the eggs to be dipped at one point, as the arms are moved on the standard and when a particular tray reaches the dipping tank the lever 18 is swung back so as to raise the tray over the tank and the lever is permitted to move forwardly so as to immerse the eggs in the tank. The tray is now raised and the arms are moved so as to bring the tray with the dipped eggs over a draining basin and the second tray is now raised and dipped into the tank. This process is continued until all of the trays have been dipped, the dipped trays being removed from the arms after the dipping and draining operation and new trays with undipped eggs substituted therefor. It is obvious that the machine can also be used for dipping eggs for washing purposes.

The trays may be left in position and the eggs removed therefrom after the dipping process, the trays being refilled with the undipped eggs.

From the foregoing description, it can be seen that I have provided a machine of exceptionally simple and durable character for effectively handling eggs for washing and dripping purposes.

Changes in details may be made without departing from the spirit or the scope of this invention, but:—

What I claim as new is:

1. An egg handling machine for the purpose set forth comprising a standard, a rotatable head carried by the standard a pair of diametrically extending supporting arms rotatable with the head, guide pulleys carried by the opposite ends of the arms, operating levers pivotally connected to the opposite ends of the arms, cables trained over the pulleys and having their inner ends connected to the levers intermediate the ends of the levers, and detachable egg receiving trays connected with the outer ends of the cables.

2. An egg handling device for the purpose specified comprising a rotatable head, a plurality of radially extending arms carried by the head, the arms being arranged in diametrically disposed pairs, guide pulleys carried by ends of the arms, rockable operating levers carried by the outer ends of the arms, guide cables trained over the pulleys having their inner ends connected to the operating levers intermediate the ends thereof, and trays detachably connected with the outer ends of the cables.

3. An egg handling device for the purpose set forth comprising a base, a standard connected with the base, a rotatable head carried by the upper end of the standard, a plurality of radially extending arms connected with the head, the arms being arranged in diametrically disposed pairs, guide pulleys carried by the outer ends of the arms, operating levers pivotally connected at their lower ends to the outer ends of the arms, cables trained over the pulleys, means connecting the inner ends of the cables to the levers intermediate their ends, a plurality of egg receiving trays, chains connected to the corners of the trays, an eye connected to the chains, and snap hooks carried by the outer ends of the cables for detachably receiving the eyes.

4. An egg handling device for the purpose set forth, comprising a base, a hollow standard secured to the base, a rotatable head including a disc shaped plate, a depending stub shaft carried by the plate rotatably mounted in the standard, radially extending arms welded to the disc, guide pulleys carried by the outer ends of the arms, egg trays detachably connected with the outer ends of the cables, pivoted levers carried by the outer ends of the arms, and means connecting the inner ends of the cables to the levers intermediate the ends thereof.

In testimony whereof I affix my signature.

LORENZO W. FINLEY.